United States Patent Office 3,443,222
Patented May 6, 1969

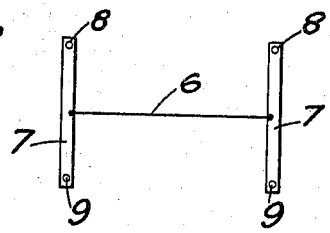
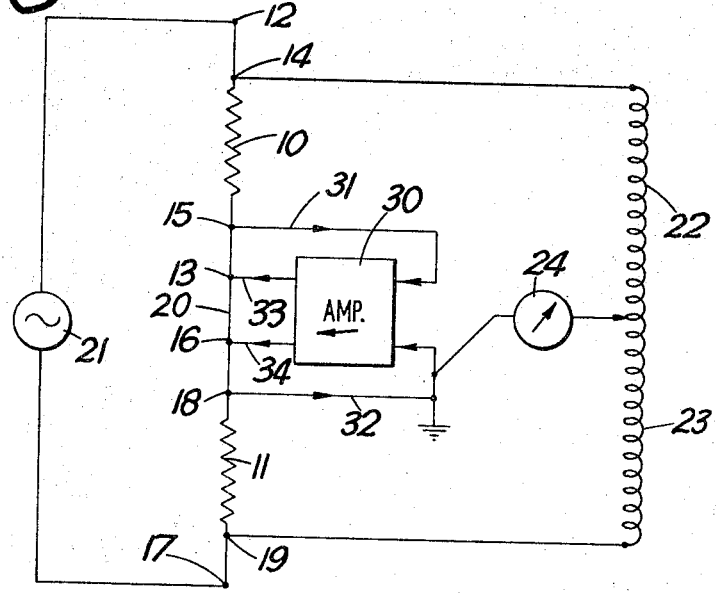
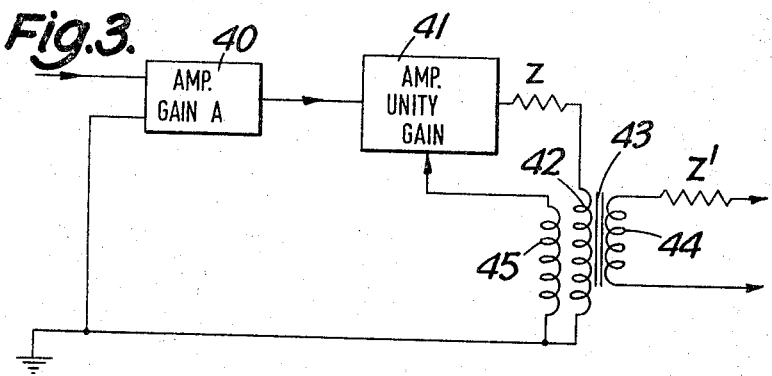

3,443,222
MEANS FOR ELIMINATING THE EFFECTS OF RESISTANCES IN ELECTRICAL MEASURING APPARATUS
John Mildwater, Chessington, England, assignor to The Wayne Kerr Company Limited, Chessington, England, a British company
Filed May 26, 1966, Ser. No. 553,189
Claims priority, application Great Britain, May 26, 1965, 22,425/65
Int. Cl. G01r 27/14, 1/30
U.S. Cl. 324—64
11 Claims

ABSTRACT OF THE DISCLOSURE

For eliminating the effects of resistances, particularly lead resistances in electrical measuring apparatus, there is provided a high gain amplifier with two leads connecting the input terminals to two points spaced along the current path at the two ends of the part of the path whose resistance is to be eliminated. The output of the amplifier is fed by separate leads to two points (which may be the same points as those previously mentioned) also at the ends of the part of the path whose resistance is to be eliminated, the amplifier and further leads being arranged to feed a current through said current path in a direction to cancel the voltage on the first pair of leads.

---

This invention relates to electrical measuring apparatus and to standard impedances, particularly standard resistances for use therewith.

For many purposes in electrical measurements, it is required to ensure that no voltage exists between two points in a circuit. For example it may be required to eliminate the effect of any lead impedance between two points or it may be required to change the impedance of a circuit by a known amount by applying a short circuit across a known impedance. In its broadest aspect, the present invention is directed to this problem of ensuring that no voltage exists between two points in a circuit.

According to one aspect of the invention, means for producing an electrical short circuit between two points comprises a high gain amplifier having its input connected to said two points so that the amplifier amplifies the voltage between the points and having its output connected to feed current between said two points in a direction tending to cancel the voltage between the points. By this arrangement, provided the amplifier gain is high enough, it will produce sufficient output current substantially to balance the current normally flowing between said points and hence will ensure that there is substantially no voltage between these points.

The invention finds particular application in impedance measurement. In such measurements, it may be necessary to take into account the impedance of electrical connections. For example, in the accurate measurement of electrical resistance and more generally in the measurement of the electrical resistances of small magnitude, it is necessary to take into account the resistance of the connections to the unknown. It is the practice, therefore, to use four terminal standard resistors that is to say devices in which there are current terminals for feeding current into and out of a resistance element and, intermediate the current terminals, there are voltage terminals. Typically the resistance element is arranged between two sections of a conductor of very low resistance, formed for example by a short length of wire or strip usually copper or brass and the voltage and current connections at each end of the resistance element made respectively to the two ends of this short length of wire or strip. Provided no current is taken from a voltage terminal, the resistance of the wire or strip between the connections thereto is immaterial. Such four terminal resistors have been known for many years and may be used for example with the type of bridge measuring circuit known as a Kelvin double bridge. In such a bridge, two four terminal resistors are connected in series by connecting current terminal of one resistor to the current terminal of the other. Between the adjacent voltage terminals of these two resistors is connected an impedance having an adjustable tap such that the two portions of the impedance can be adjusted to divide the voltage drop in the junction between the resistors in the appropriate ratio. This tap is connected to one side of the detector or other output circuit the other sides of which is connected to the junction between the two ratio arms of the bridge. The other ends of the ratio arms are connected to the remaining two voltage terminals of the two resistors. The supply current is fed to the remaining two current terminals. This device is known as a double bridge because of the double balancing which is required. More recently in a paper entitled "An Alternating Current Analogue of the Kelvin Double Bridge" published in the proceedings of the Institution of Electrical Engineers, part C, volume 109, page 307, D. L. H. Gibbings has described an alternating current circuit arrangement making use of transformer ratio arms and inductive dividers. This again is a double bridge, the detector being connected in two alternative positions for the two balances to be made.

The present invention enables the effects of the lead impedances in such measuring apparatus to be eliminated or reduced whilst avoiding the necessity of a double balancing operation.

Thus, according to a further aspect of the invention, in electrical measuring apparatus, where the impedance between two points on a lead or in a circuit has to be eliminated or minimised, the input of a high gain amplifier is connected to said two points (referred to hereinafter as amplifier input connection terminals) so that the amplifier amplifies the voltage between these points and the output of said amplifier is connected to current terminals to feed a current through said lead or circuit in a direction tending to cancel the voltage variations. Any voltage between the amplifier input connection terminals is amplified by the amplifier and provided the gain is high enough, the amplifier will provide sufficient current substantially to balance the current, normally flowing through the lead, which produces this voltage. This arrangement may be used for direct current or for alternating current circuits.

Considering for example the measurement of resistance using an alternating current analogue of the Kelvin double bridge in which two four terminal resistors are connected in series by a lead between current terminals on the two resistors, the amplifier input may be connected to the voltage terminals at the interconnected ends of the two resistors and the amplifier output current is fed between the interconnected current terminals of the two resistors, i.e. between the ends of the resistance portions of which it is required to minimise or eliminate the impedance. In the previously described type of construction of four terminal resistors in which said end of a resistance element is connected to a length of thick wire or strip, the effective voltage connection is at the junction of the resistance element and wire or strip. The further current input connections are each effected by connection to the thick wire between this point and the current terminal preferably as close as possible to the junctions of the thicker wire and resistance element. This ensures that no current flows through any part of the voltage lead. In a typical construction, the voltage and current terminals are at the two ends of a thick metal wire for example a copper wire and the resistance element extends from intermediate point on this wire. There is no practical difficulty in making a further connection to this thick wire closely adjacent the connection to the resistance element preferably on the part of the thick metal wire leading to the current terminal. It will be seen that using the arrangement described above, a current is fed through the circuit interconnecting the two resistors for the current feed between them. This current is dependent on the voltage between voltage terminals and compensates for this voltage irrespective of the impedance of the current circuit interconnecting the two resistors and independent of any current otherwise flowing therethrough. Hence the impedance of these current leads and of the terminals and interconnecting circuit means between the resistors is effectively reduced and for practical purposes may often become negligible.

As another example of the application of the invention, in the measurement of the conductivity of a liquid, it is the usual practice to feed a current through an electrode into the liquid to pass therethrough to a further electrode. Difficulties in such arrangement arise due to the boundary effects at the electrode surfaces but these can be eliminated using the arrangement described in the specification of British Patent No. 982,290 in which an electrode is moved through a predetermined distance and the change in conductivity is measured. In such an arrangement it may be required in a bridge balancing circuit to switch in and out of circuit a resistance. For this purpose a four terminal resistor may be employed and the voltage terminals thereof connected to the input terminals of the high gain amplifier the output of which is applied to input current terminals connected to said resistor at the points which are to be short circuited. Usually these current input terminals in this case would be as close as possible to the ends of the resistance element. Using this arrangement, a balancing current is passed through the resistance element between the input current terminals fed from the output of the amplifier and hence effectively there is negligible voltage drop across this portion of the resistor. It thus becomes possible effectively to short circuit a resistance element without disturbing the connections thereto and without introducing any additional leads in the circuit which may themselves have some residual impedance.

Thus the invention furthermore includes within its scope electrical measuring apparatus wherein means are provided for changing the impedance of a circuit by a predetermined amount comprising a four terminal resistor having current terminals connected into said circuit so that the resistance is in series in the circuit and having voltage terminals, and a high gain amplifier having input terminals connected to the voltage terminals of the resistor and having output terminals connected to said resistor to feed a current therethrough in a direction tending to cancel the voltage between the said voltage terminals.

In the foregoing, mention has been made of four terminal resistors with additional current input terminals for a balancing current through the connecting leads. The invention furthermore includes within its scope a resistor for electrical measurement purposes comprising a resistance element, two electrical conductors of substantially greater cross-sectional area than the resistance element, the two ends of the resistance element being connected respectively to the two conductors whereby each of said electrical conductors constitutes at one of its ends a current input connection and at the other of its ends a further current connection, and wherein further leads are connected, one to each of said conductors, closely adjacent the point of connection thereto of the resistance element and preferably on the parts of said conductors between the resistance element and the current input connections.

In the following description reference will be made to the accompanying drawings in which:

FIGURE 1 is an electrical diagram illustrating a four terminal resistor;

FIGURE 2 is a circuit diagram of a bridge circuit for comparing the magnitude of two four terminal resistors;

FIGURE 3 is a diagram illustrating a modification of the arrangement of FIGURE 2;

Figure 4:
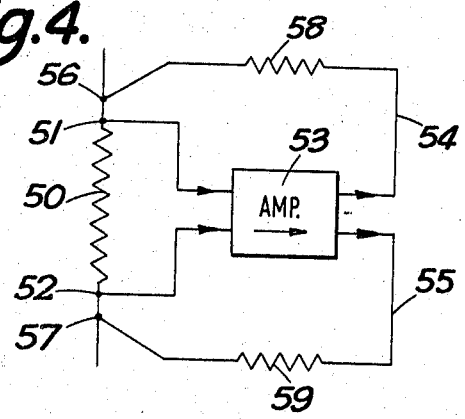
FIGURE 4 is a diagram illustrating how a series connected four terminal resistance element may be short circuited without introducing a further lead impedance.

Referring to FIGURE 1, a four terminal resistor is illustrated diagrammatically as comprising a resistance element 6 extending between two conductors 7, typically thick copper, wire or strip. Each conductor carrier has a voltage terminal 8 at one end and a current terminal 9 at the other end. The current and voltage connections are thus independent of one another and internal circuit connections can be made to be responsive to the voltage across the element 6 without affecting the current therethrough or vice-versa.

Although it is preferred to use the form of four terminal resistor illustrated in FIGURE 1, the present invention can be used with other types of resistor and, in the following description, consideration is given where necessary to the possibility that each voltage terminal may be between a current terminal and the resistance element or vice-versa. It will be immediately apparent however that the resistor of FIGURE 1 may be used in any of the circuit arrangements described below.

In FIGURE 2 there is illustrated a simplified form of bridge circuit for comparing two four terminal resistors 10, 11. The resistor 10 has two current input terminals 12, 13 and two voltage terminals 14, 15. The resistor 11 has two current input terminals 16, 17 and two voltage terminals 18, 19. The current input terminals 13, 16 are connected together by a connection 20 which it is desired should have zero effective impedance. The connection in practice, may include a connecting lead which has to be secured to terminals on the two resistors and its actual impedance may not be known or calculable. An alternating current source 21 is connected across the current input terminals 12, 17 to provide an alternating current which flows through the two resistors 10, 11 in series and through the connection 20. Across the voltage terminals 14 and 19 is connected an inductive potential divider 22 having an adjustable tap 23 which is connected to one side of a null balance detector 24. The other side of this null balance detector has to be connected effectively to the junction of the two resistors 10, 11. If the detector could be connected effectively to the junction of the two resistors, by adjustment of the tap 23 to obtain a null balance, the ratio of the two portions of the inductive potential divider 22 measures the ratio of the magnitudes of the two resistors 10, 11. In describing the present invention, it is not believed necessary to refer in any further detail to the construction or operation of the measuring bridge which has been illustrated in a very simplified form. The connection between the two resistors will have some finite impedance and this may be of appreciable significance when making very accurate measurements or when making a comparison of resistances of low magnitude. Due to this impedance there will be a voltage across the connection 20 between the resistors 10, 11. It is required to bring the voltage terminals 15, 18 to the same potential.

In the arrangement illustrated in FIGURE 2 a high gain amplifier 30 has its input connected by leads 31, 32 to the two voltage terminals 15 and 18. The output of the amplifier is connected by leads 33, 34 to the current terminals 13, 16 of the resistors 10, 11. The alternating voltage between the terminals 15, 18 causes a current to flow into the input to the amplifier 30 and this produces an output on leads 33 and 34 which is fed back to the terminals 13, 16 so that a current flows through the connection 20 between the two resistors 10, 11 in the portion thereof between the terminals 13, 16. This current flow into the amplifier input will produce a voltage at terminals 13, 16 in opposition to the voltage developed by the normal current flow through the connection 20 of a sense such as to tend to balance the input to the amplifier. Since the amplifier has a high gain, the magnitude of this voltage will be such as to tend to leave only a very small residual at the amplifier input, that is to say between the voltage terminals 15, 18. This small residual voltage due to the high gain of the amplifier gives the required output and the effective impedance of the connection 20 between the terminals 15, 18 becomes negligible. It will be noted that the current flow through the portion 20 between the current input terminals 13 and 16 produces a potential to balance that due to the normal current flow through the whole section between the voltage terminals 15 and 18. There is thus negligible potential difference between the voltage terminals 15 and 18. By this arrangement the effective magnitude of the impedance 20 between the two resistors 10, 11 and any variations of this impedance are very substantially reduced and may be negligible. One of the input terminals of the amplifier may be earthed and the detector 24 may conveniently be connected to this earthed terminal. Alternatively the detector 24 may be connected directly to one of the voltage terminals 15 or 18 since no current flows through the bridge detector at balance.

To analyse the effect of the amplifier, consider that the resistance between terminals 15 and 13 is $r_1$ and that the resistance between terminals 13 and 16 is $r_2$ and that the resistance between the terminals 16 and 18 is $r_3$. Let the unknown current between the two resistors 10, 11 be $I_u$ and the amplifier voltage gain $\mu$ and the amplifier output impedance $z$. Then the input voltage $e$ at the amplifier is $$e = I_u(r_1+r_2+r_3) - \frac{E_o r_2}{r_2+z}$$

where $E_o$ is the output voltage of the amplifier.
But $E_o = \mu e$ and hence $$e\left[1+\frac{\mu r_2}{r_2+z}\right] = I_u(r_1+r_2+r_3)$$

Thus the effective resistance between the terminals 15, 18 is $$\frac{e}{I_u} = \frac{r_1+r_2+r_3}{r_2+z+\mu r_2}(r_2+z)$$

Since the original impedance between terminals 15, 18 was $(r_1+r_2+r_3)$, the improvement factor is $$\frac{(1+\mu) r_2+z}{r_2+z}$$

If $z$ is small compared with $r_2$, the improvement factor is $(1+\mu)$. In general, $z$ is likely to be comparable with $r_2$ and the improvement factor is $$\frac{2+\mu}{2}$$

It will be seen that with a high gain amplifier, the voltage between the terminals 15, 18 is reduced to a small fraction of what it is without the amplifier and, in practice becomes negligible.

Since the output impedance of the amplifier is of importance, it may be advantageous in some cases to use a step down transformer in the output of the amplifier as shown in FIGURE 3. Referring to that figure there is shown a first stage amplifier 40 of the gain A which might be a single stage tuned amplifier and the output of which is fed to a unity gain amplifier 41 having its output circuit feeding the primary winding 42 of a step down transformer 43 having a secondary winding 44 and a tertiary winding 45 closely coupled to the secondary winding to provide a feedback to the amplifier 41. With this feedback arrangement from the tertiary winding it is possible to ensure that the amplifier 41, to a very close degree, gives a unity gain between its input and the output from the winding 44 subject however to the multiplication factor introduced by the turns ratio between the windings 45 and 44 and irrespective of the magnetising losses in the winding. If this transformer is arranged to give a step down ratio in this way of $n$ then it may be shown that $$z_o = \frac{z}{n^2} + z'$$

where $z$ is the output impedance of amplifier 41 and $z'$ is the winding and load impedance of the transformer secondary winding 44. If, as is normally the case, $r_1$ and $r_3$ can be neglected compared with $r_2$; then the gain in the above analysis becomes $A/n$ and thus $$r^1 = \frac{r_2}{1+\frac{nAr_2}{z+n^2 z'}}$$

By this construction the effective lead and winding impedance can be reduced to a magnitude very much smaller than the output impedance of the amplifier and typically to a value which might be a small fraction of a milliohm. It will be noted that the output winding 44 need not be earthed but can be left floating as shown in FIGURE 3. The amplifier inputs need not be earthed on one side but could be differential inputs.

In the example shown in FIGURE 2, the current input terminals lie between the voltage terminals. This is because, in this particular embodiment, it is required to have negligible voltage between the voltage terminals 15, 18 without affecting the circuit outside those terminals by feeding a current into the circuit outside these terminals. FIGURE 4 illustrates the converse case in which it is required to have negligible voltage between two terminals without feeding any current into the circuit between these terminals.

Figure 5:
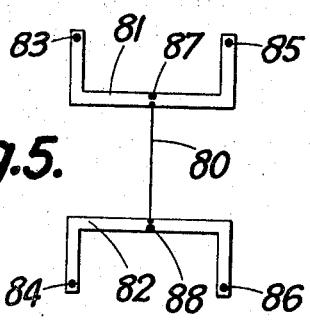
FIGURE 5 shows a resistance element for use in the arrangement of FIGURE 4.

FIGURE 4 illustrates how it is possible to put an effective short circuit across a resistor without introducing any lead impedance. The resistor is shown at 50 and is constructed as previously described with voltage and current terminals. The voltage terminals 51, 52 are connected to the input of a high gain amplifier 53 having its output connected by leads 54, 55 to current input terminals 56, 57 on the resistor 50. When the amplifier is operative it provides a current between the terminals 56, 57 which will balance the normal current flowing therebetween and so ensure that there is effectively negligible potential between the terminals 56, 57. This effectively short circuits the resistor 50. Such a short circuit can thus be applied by making the amplifier operative without disturbing any connections and without introducing any lead impedance. The short circuit is effective irrespective of any impedance in the amplifier connections such as is indicated by resistors 58, 59. A preferred construction of resistor is shown in FIGURE 5 with a resistance element 80 connected between two U-shaped conductive members 81, 82 of substantial cross-section. Connections for the circuit current are made at 83 and 84 to one end of each of the members 81, 82 and connections for the compensating current are made at the other ends at 85, 86. The voltage sensing connections are made at 87, 88 on the members 81, 82 close to the resistance element so as to sense the voltage across that element as accurately as possible. The connections 85, 86 thus correspond to 56 and 57 of FIGURE 4 whilst 87 and 88 correspond to 51 and 52.

In the arrangement of FIGURE 4, let R be the magnitude of resistor 50, $e$ the amplifier input voltage, $\mu$ the amplifier voltage gain, $E_o$ the amplifier output voltage, $z$ the amplifier output impedance and $I_o$ the amplifier output current. If $I_u$ is the unknown current flowing through resistor 50, then $$I_u - I_o = e/R$$
$$E_o = \mu_e$$
$$I_o = \frac{E_o}{R+z}$$

since the impedances of the connecting portions of lead between terminals 51 and 56 and between terminals 52 and 57 is negligible compared with R.

Hence $$e = \frac{I_u R}{1 + \frac{\mu R}{R+z}}$$

With a high gain amplifier this is negligible. The current through the whole of the resistor between the current input terminals 56, 57, is the very small difference between $I_u$ and $I_o$. In this particular arrangement, because of this negligible current, the small impedances of the connections to the resistor between terminals 51 and 56 and between terminals 52 and 57 can be ignored. More generally, however, the circuit arrangement of FIGURE 4 provides a balancing current such as to minimise or eliminate the whole voltage drop between the voltage terminals irrespective of any impedances in the circuit through which the output current from the amplifier is applied to the portion across which, the voltage is to be balanced. This balancing of the voltage, between the voltage terminals connected to the amplifier input occurs whether the current terminals lie inside, that is between the voltage terminals as in FIGURE 2 or whether the current terminals lie outside the voltage terminals as in FIGURE 4. It will be noted that the arrangements of FIGURES 2 and 4 can be used with both direct current and alternating current.

Figure 6:
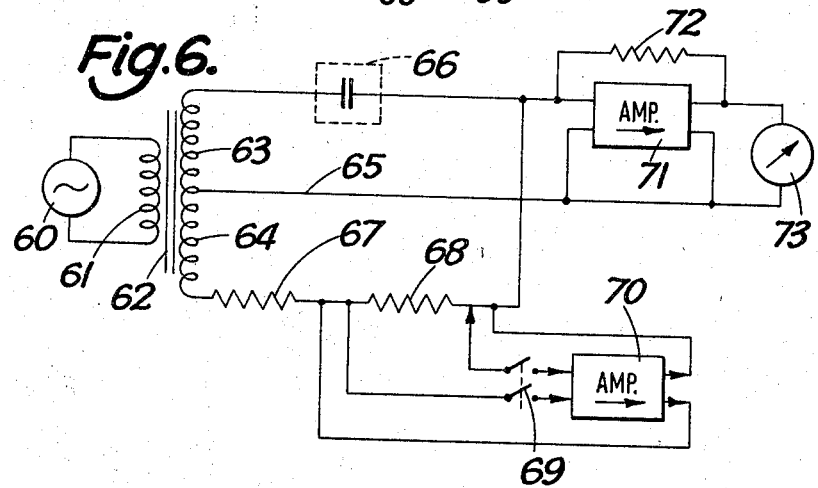
FIGURE 6 is a circuit diagram illustrating an application of the arrangement of FIGURE 4.

FIGURE 6 illustrates the application of the arrangement of FIGURE 4 to the measurement of the conductivity of a liquid. In the circuit arrangement of FIGURE 6, an alternating voltage source 60 feeds a primary winding 61 of an input transformer 62 having two closely coupled secondary windings 63, 64 providing voltages with respect to a neutral line 65 in known ratio. These two windings 63, 64 form two adjacent arms of a bridge circuit, the other two arms being constituted one by a conductivity measuring cell 66 and the other by a standard resistance 67 in series with a second standard resistance 68 which can be effectively switched out of the circuit by closing a switch 69 which brings into operation a unit 70 corresponding to the amplifier 53 and resistors 58, 59 of FIGURE 4. The cell 66 is of the kind, such as is described for example in the specification of British Patent No. 982,290, having two spaced electrodes in the liquid, the spacing of which can be altered by a known amount. The cell is constructed so that the current flow path is of uniform known cross-section and thus by measuring the change in impedance for a known change in spacing, the conductivity of the liquid can be measured irrespective of any end effects near the electrodes. The switched resistance 68 is chosen to have a value as close to the magnitude of the change in impedance of the cell as it is possible to calcuate. The other fixed resistance is chosen so that the bridge circuit is, as close as possible, balanced with the switch 69 opened or closed as appropriate according to the electrode spacing. The small differences from the balance are measured by means of a high gain amplifier 71 having a feedback impedance 72 of known magnitude. The currents through the cell 66 and the standard resistances 67, 68 are fed, in opposition, into the amplifier so that an indicator 73 measuring the output voltage (or feedback current) indicates the difference of the two input currents to the amplifier. Typically the indicator 73 is a meter which may, for full scale deflection, indicate 0.1% difference between the two inputs to the amplifier. This arrangement thus provides very sensitive indications of any differences between the measured conductivity and that corresponding to the switched standard 68. This switch has to be highly accurate. The lead eliminator 70 provides a near-perfect short circuit to switch the standard 68 out when the cell electrode is moved an accurately gauged distance. The other elements in the circuit of FIGURE 6 are concerned with the measurement of the small differences and it is readily possible to obtain the required accuracy for this.

I claim:

1. Means for eliminating the effects of resistance in a part of an electrical circuit forming a continuous current path, which means comprise a high gain amplifier having a pair of input terminals and a pair of output terminals, a first pair of leads directly connecting said input terminals to two points spaced along said current path at opposite ends of the part of the circuit whose resistance is to be eliminated, and a second separate pair of leads directly connecting the output terminals to two points spaced along said current path at opposite ends of the part of the circuit whose resistance is to be eliminated, said amplifier being arranged to feed current into said second pair of leads to pass through said part of the circuit in a direction tending to cancel the voltage on said first pair of leads.

2. Means as claimed in claim 1 wherein said first pair of leads are connected to said current path at points spaced outside the two points to which said second pair of leads are connected.

3. Means as claimed in claim 1 wherein said first pair of leads are connected to said current path at points between the two points to which said second pair of leads are connected.

4. Means as claimed in claim 1 and for use with alternating currents wherein a step-down transformer is connected between said output terminals and said second pair of leads.

5. Means as claimed in claim 1 wherein said high gain amplifier comprises a high gain stage having said input terminals and an output, a further unity gain amplifier stage fed from said output and a step-down transformer having a primary, a step-down secondary and a tertiary winding, said primary winding being fed from said further amplifier stage, said secondary winding being connected to feed current to said second pair of leads and said tertiary winding providing a feedback to said further amplifier stage so that the further amplifier stage holds the output voltage on said tertiary winding closely equal to the input voltage to said further stage from said high gain stage.

6. Electrical measuring apparatus constituting an alternating current analogue of a Kelvin double bridge which apparatus comprises first and second four-terminal resistors, each having first and second current input terminals and first and second voltage terminals, the first voltage terminal of each resistor being at the same end as the first current terminal and the second voltage and current terminals being at the opposite end, an alternating voltage source, means connecting the first current input terminal of one resistor to the first current input terminal of the second resistor, means connecting the voltage source across said second current input terminals of the two resistors, an adjustably tapped potential divider, means connecting the two ends of the potential divider to said second voltage terminals of the two resistors, a high gain amplifier having two input terminals and two output terminals, leads directly connecting said two amplifier input terminals respectively to said first voltage terminals of the two resistors, leads directly connecting said two amplifier output terminals respectively to said second current terminals of the two resistors, and a null balance indicator connected between the tap on the potential divider and one of said two first voltage terminals.

7. Electrical measuring apparatus as claimed in claim 6 wherein said potential divider is an inductive potential divider.

8. In electrical measuring apparatus of the bridge type, means for changing the impedance of a circuit by a predetermined amount comprising the combination of a circuit forming a current path and including a resistor with current input terminals and voltage terminals, the current path being through said current input terminals, a high gain amplifier having two input terminals and two output terminals, leads directly connecting said voltage terminals to said input terminals, further leads directly connecting said output terminals to said current terminals to feed a current from the amplifier through the resistor in a direction tending to cancel the voltage between the voltage terminals, and switch means for inhibiting any feedback from the amplifier to said current terminals.

9. The combination as claimed in claim 8 wherein said switch means comprise switches for open-circuiting said leads from said voltage terminals to said input terminals.

10. The combination as claimed in claim 8 wherein said voltage terminals are between said current terminals along said current path.

11. The combination as claimed in claim 8 wherein said circuit forms part of a first arm of a bridge and wherein there are provided a pair of inductive ratio arms forming second and third arms of the bridge, a fourth arm containing an unknown impedance, an alternating current source coupled to said inductive ratio arms and a detector connected between the junction of the first and fourth arms and the junction of the second and third arms.

References Cited

UNITED STATES PATENTS

| | | | |
|---|---|---|---|
| 1,601,840 | 12/1926 | Angus | 338—322 XR |
| 2,358,480 | 9/1944 | Skilling | 324—123 |
| 2,708,701 | 5/1955 | Viola | 338—322 XR |
| 3,056,919 | 10/1962 | Kuipers | 324—62 XR |
| 3,089,097 | 5/1963 | Bell | 330—103 XR |
| 3,341,773 | 9/1967 | Julie | 324—62 XR |

FOREIGN PATENTS

| | | |
|---|---|---|
| 914,528 | 1/1963 | Great Britain. |
| 922,569 | 4/1963 | Great Britain. |

RUDOLPH V. ROLINEC, *Primary Examiner.*

E. E. KUBASIEWICZ, *Assistant Examiner.*

U.S. Cl. X.R.

323—96; 324—123; 330—103